US011113695B2

(12) United States Patent
Shah et al.

(10) Patent No.: US 11,113,695 B2
(45) Date of Patent: *Sep. 7, 2021

(54) TOKEN-BASED DETERMINATION OF TRANSACTION PROCESSING RESOURCES

(71) Applicant: PAYPAL, INC., San Jose, CA (US)

(72) Inventors: Dhaval Bhupendrabhai Shah, San Jose, CA (US); Nitin Prahbu, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 621 days.

This patent is subject to a terminal disclaimer.

(21) Appl. No.: 15/703,680

(22) Filed: Sep. 13, 2017

(65) Prior Publication Data

US 2018/0137508 A1     May 17, 2018

Related U.S. Application Data

(60) Provisional application No. 62/491,946, filed on Apr. 28, 2017, provisional application No. 62/422,552, filed on Nov. 15, 2016.

(51) Int. Cl.
*G06Q 20/02* (2012.01)
*G06Q 20/40* (2012.01)
(Continued)

(52) U.S. Cl.
CPC .......... *G06Q 20/405* (2013.01); *G06Q 20/02* (2013.01); *G06Q 20/32* (2013.01); *G06Q 20/36* (2013.01); *G06Q 20/385* (2013.01)

(58) Field of Classification Search
None
See application file for complete search history.

(56) References Cited

U.S. PATENT DOCUMENTS 6,112,987 A     9/2000  Lambert et al.
8,572,690 B2 * 10/2013  Radhakrishnan ....... G06F 21/34
                                                  726/2
(Continued)

FOREIGN PATENT DOCUMENTS

WO     WO-2018034912 A1 *  2/2018  ............. G06F 21/60

OTHER PUBLICATIONS

Payment Token Format Reference [online]. Apple Inc. 2017 [retrieved Aug. 15, 2017]. Retrieved from the Internet: <URL:https://developer.apple.com/library/content/documentation/PassKit/Reference/PaymentTokenJSON/PaymentTokenJSON.html>.
(Continued)

*Primary Examiner* — Narayanswamy Subramanian
(74) *Attorney, Agent, or Firm* — Haynes and Boone, LLP

(57) ABSTRACT

The method comprises receiving a token request, from a first transaction system, for generating a token associated with a user account. Responsive to receiving the token request, generating the token that authorizes use of an initial transaction resource at a second transaction system. The method includes generating transaction preferences that associate the token with a plurality of transaction resources at the second transaction system. The token is transmitted to the first transaction system for use at the first transaction system. The method includes receiving a transaction request, including the token, for using the token for a first transaction. In response to receiving the transaction request, the transaction is processed based on the token, a state of the first user account, and the transaction preferences. The processing of the transaction includes determining whether to revise use of the initial transaction resources to one or more other transaction resources.

20 Claims, 10 Drawing Sheets

(51) Int. Cl.
  *G06Q 20/38* (2012.01)
  *G06Q 20/36* (2012.01)
  *G06Q 20/32* (2012.01)

(56) References Cited

U.S. PATENT DOCUMENTS

| | | | |
|---|---|---|---|
| 9,300,538 B2* | 3/2016 | Reddy | H04L 67/42 |
| 10,003,507 B2* | 6/2018 | Wood | H04L 45/308 |
| 10,402,830 B2* | 9/2019 | Shah | G06Q 20/36 |
| 2007/0125838 A1 | 6/2007 | Law | |
| 2007/0162337 A1 | 7/2007 | Hawkins et al. | |
| 2008/0103923 A1 | 5/2008 | Rieck et al. | |
| 2009/0198614 A1 | 8/2009 | De Ruiter et al. | |
| 2009/0307134 A1* | 12/2009 | Gupta | G06Q 20/3821 705/44 |
| 2011/0010289 A1 | 1/2011 | Kranzley | |
| 2012/0303425 A1 | 11/2012 | Katzin et al. | |
| 2012/0310838 A1* | 12/2012 | Harris | G06Q 20/322 705/65 |
| 2013/0046696 A1* | 2/2013 | Radhakrishnan | G06Q 20/38215 705/65 |
| 2013/0047202 A1* | 2/2013 | Radhakrishnan | G06F 21/335 726/1 |
| 2013/0238503 A1 | 9/2013 | Patel | |
| 2014/0040139 A1 | 2/2014 | Brudnickl | |
| 2014/0149285 A1 | 5/2014 | De et al. | |
| 2014/0164119 A1 | 6/2014 | Narayanan | |
| 2015/0032626 A1* | 1/2015 | Dill | G06Q 20/40 705/44 |
| 2015/0032627 A1* | 1/2015 | Dill | H04L 9/32 705/44 |
| 2015/0254656 A1* | 9/2015 | Bondesen | G06Q 20/385 705/41 |
| 2016/0019536 A1* | 1/2016 | Ortiz | G06Q 20/3227 705/67 |
| 2016/0119296 A1* | 4/2016 | Laxminarayanan | H04L 9/14 713/168 |
| 2016/0171479 A1* | 6/2016 | Prakash | G06Q 20/3226 705/44 |
| 2016/0224966 A1 | 8/2016 | Van Os et al. | |
| 2016/0224967 A1 | 8/2016 | Davis et al. | |
| 2016/0239842 A1 | 8/2016 | Cash et al. | |
| 2016/0300226 A1 | 10/2016 | Novac et al. | |
| 2016/0307196 A1* | 10/2016 | Achhra | G06Q 20/40 |
| 2016/0371680 A1 | 12/2016 | Miles | |
| 2017/0300895 A1* | 10/2017 | Shanmugam | G06Q 20/2295 |
| 2017/0300906 A1* | 10/2017 | Shanmugam | G06Q 20/223 |
| 2017/0364914 A1* | 12/2017 | Howard | G06Q 20/3226 |
| 2018/0137508 A1* | 5/2018 | Shah | G06Q 20/36 |
| 2018/0285864 A1* | 10/2018 | Dill | G06Q 20/4016 |
| 2018/0293573 A1* | 10/2018 | Ortiz | G06Q 20/023 |
| 2018/0336559 A1* | 11/2018 | Shah | G06Q 20/405 |
| 2019/0095607 A1* | 3/2019 | Howard | H04W 12/06 |
| 2019/0122209 A1 | 4/2019 | Shah et al. | |

OTHER PUBLICATIONS

RSA SecurID Token Record Decryption Guide, pp. 1-12, EMC Corporation; Part No. 6269A0, Dec. 2013.

HCE cashless 3.0 Activate NFC mobile-based payments on contactless acceptance devices. TAS Group; [retrieved on Jan. 26, 2017]. Retrieved from the Internet: <URL: https://www.google.com/url?sa=t&rct=j&q=&esrc=s&source=web&cd=1&ved=0ahUKEwiOwP3BiLjaAhWI-IQKHf1HDUkQFggpMAA&url=https%3A%2F%2Fwww.tasgroup.eu%2Fsolutions%2Fcashless-world%2Fe-m-commerce%2Fc1-hce&usg=AOvVaw05FdiG5KXh2irdPZ94ovAU>.

U.S. Real-Time Payment Business Playbook; The Clearing House Payments Company L.L.C., Version 1.01, Mar. 2016, pp. 1-45. Retrieved from the Internet: <URL: http://www.wespay.org/wpa/docs/TCH_RTP_Business_Playbook_Version_103_03_2016.pdf>.

What Is Tokenizaton? [online]. TokenEx [retrieved Aug. 15, 2017]. Retrieved from the Internet: <URL: https://tokenex.com/resource-center/what-is-tokenization/>.

EMV Payment Tokenisation Specification (Year: 2014).

PCT International Searching Authority—US, PCT Notification of Transmittal of the International Search Report and the Written Opinion of the International Searching Authority, or the Declaration, dated Mar. 18, 2020 for International Application No. PCT/US2019/067671, 8 pages, Alexandria, VA.

* cited by examiner

RELOAD YOUR PAYPAL BALANCE

- LIKE A PREPAID CAR. DON'T HAVE ENOUGH IN YOUR BALANCE? WE'LL TRANSFER MONEY FROM YOUR BANK, CC, OR DC TO COVER THE PURCHASE

- THEN WE'LL RELOAD YOUR BALANCE TO AMOUNT YOU SET

WHEN BALANCE IS $0:
RELOAD BALANCE TO $25
RELOAD FROM: CARD A

GET $10 TO SPEND WHEN DONE

FIG. 5

TOKEN-BASED DETERMINATION OF TRANSACTION PROCESSING RESOURCES

RELATED MATTERS

This application claims priority benefit of U.S. Provisional Patent Application Ser. No. 62/491,946, titled "Token-Based Determination of Transactions Processing Resources" filed on Apr. 28, 2017. This application also claims priority benefit of U.S. Provisional Patent Application Ser. No. 62/422,552, titled "Systems and Methods for a Virtual Card Linked to an Account Maintained by a Payment Service Provider" filed on Nov. 15, 2016. The contents of both applications are incorporated by reference in their entirety.

BACKGROUND

Embodiments of the present disclosure generally relate to the field of communication systems and, more particularly, to using detokenized tokens at communication systems for transaction processing.

BRIEF DESCRIPTION OF THE DRAWINGS

The present embodiments may be better understood, and numerous objects, features, and advantages made apparent to those skilled in the art by referencing the accompanying drawings.

FIG. 5 illustrate another embodiment of the UI of the user device for onboarding the transaction instrument of one transaction system onto another transaction system.

DESCRIPTION OF EMBODIMENT(S)

The description that follows includes exemplary systems, methods, techniques, instruction sequences, and computer program products that embody techniques of the present disclosure. However, it is understood that the described embodiments may be practiced without these specific details. For instance, although some examples refer to online stores, communication with other types of providers of goods and/or services is contemplated, such as online marketplaces and/or auctions. Similarly, although some examples refer to Point-of-Sale (POS) devices, communication with other devices is contemplated, such as with mobile devices and wearables. The described embodiments can be used with other applications that use token services providers and/or token-based authorization of transactions, such as for Single Page Applications (SPAs) and/or Software-as-a-Service (SaaS).

The current disclosure is directed to token-based automatic transaction processing. The method comprises receiving a token request from a first system, the token request for generating a token associated with a first user account. In response to receiving the token request, the token is generated, where the token authorizes use of an initial transaction resource at a second system. The method includes generating transaction preferences to associate the token with a plurality of transaction resources at the second system. The token is transmitted to the first system for use at the first system. The method includes receiving a transaction request that comprises the token, from the a user device associated with the first user token, the transaction request for using the token for a transaction (such as a payment transaction). In response to receiving the transaction request, the transaction is processed based on the token, a state of the first user account, and the transaction preferences. The processing of the transaction includes determining whether to revise use of the initial transaction resource to using one or more other transaction resources. The following description, and associated Figures, illustrates various embodiments directed to the ideas listed above.

Figure 1A:
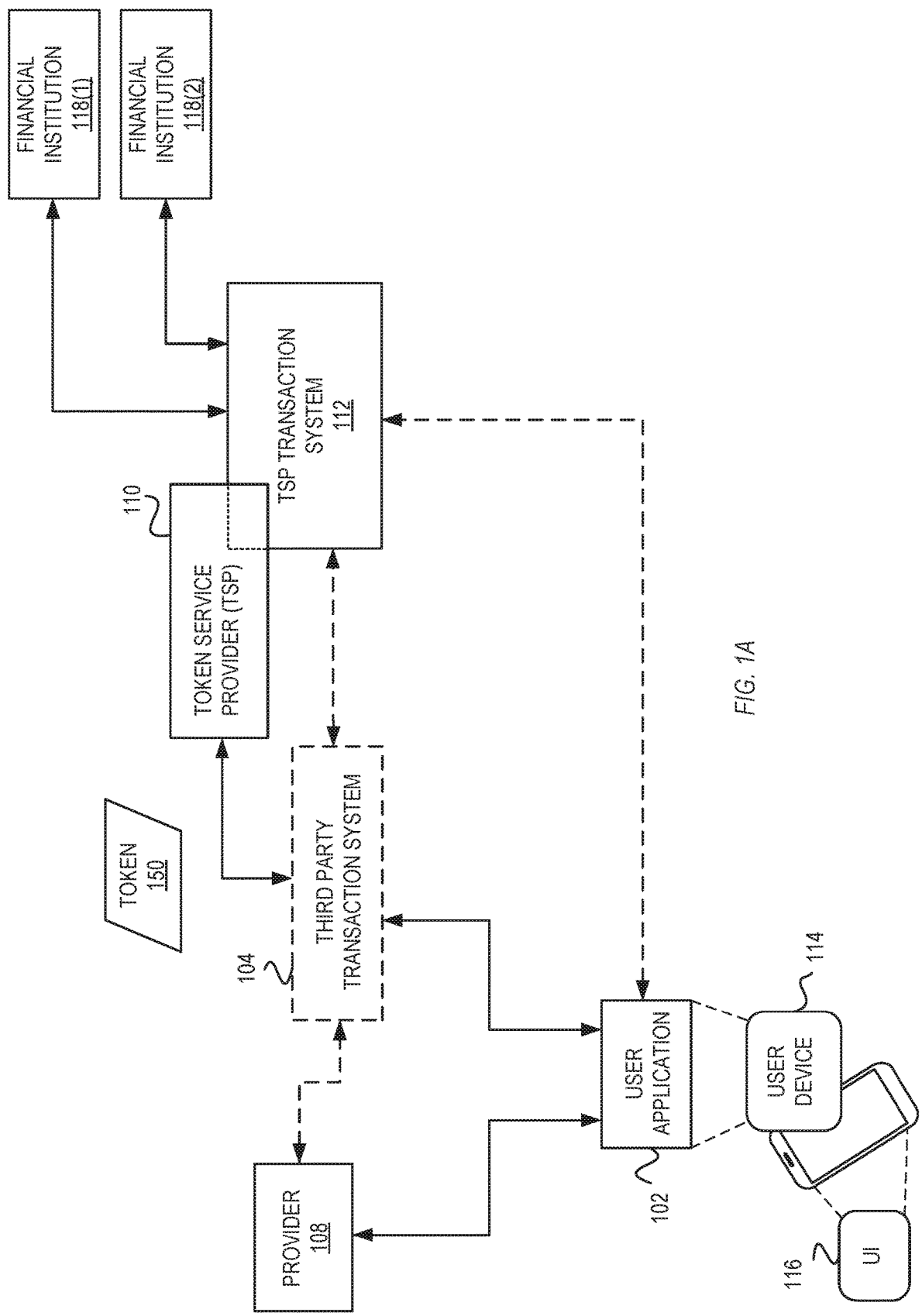
FIG. 1A is a system diagram illustrating embodiments of a communication system showing communication for establishing communication between a token service provider (TSP), a TSP transaction system, and a third party payment system.

FIG. 1A is a system diagram illustrating embodiments of a communication system showing communication between a token service provider (TSP), a TSP transaction system, and a third party payment system. A third party transaction system 104 can request tokens from a token service provider (TSP) 110. The TSP 110 can generate the token in response to the token request. Based on the type of request, the token can be an open loop token or an closed loop token (as discussed below). The TSP transaction system 112 is associated with various transaction resources, one or more of which can be used to complete transactions. The TSP transaction system 112 can associate transaction preferences with the token. The transaction preferences can indicate which of the transaction resources can be used with transactions. The transaction preferences can be used (e.g., as rules) to determine when different transaction resources are selected for use. Many of the examples described herein refer to payment systems. In some embodiments, the TSP transaction system 112 can implement SaaS functionality, such as to provide secure software services to the user device 114.

The third party transaction system 104 can act as an intermediary between the user application 102 and the TSP 110. Thus, the third party transaction system 104 can request tokens from the TSP 110, and then forward the received token to the user application 102. In some embodiments, the third party transaction system 104 can incorporate the transaction resource(s) associated with the token as part of transaction resources offered to the user application 102 by the third party transaction system 104. The third party transaction system 104 can be implemented as a stand-alone entity, or as part of another system. Regardless of the implementation, the third party transaction system 104 provides the received token to the user application 102 for use at the provider 108.

In some embodiments, the third party transaction system 104 can be implemented as a standalone entity, such as hosted using cloud services, that communicates via a network with the user application 102, the TSP 110, and/or the TSP transaction system 112. In some embodiments, the third party transaction system 104 can be implemented as part of the TSP transaction system 112. For example, the third party transaction system 104 can be implemented as a container, or another software structure, of the TSP transaction system 112. In some embodiments, the third party transaction system 104 can be implemented as part of the user application or the user device. For example, the third party transaction system 104 can be implemented as part of a trusted execution environment on the user device 114. The third party transaction system 104 can use Host Card Emulation (HCE), Trusted Execution Environment (TEE), and/or Secure Element (SE) for security on the user device 114.

A token service provider (TSP) can provide tokens to a requesting entity, such as to authenticate the requesting entity to use certain resource(s). The token can provide authentication for a certain amount of time, and the token can be used in certain communication sessions. The token can be an encoded value that is generated by the TSP, and can be secure to communicate between the TSP, transaction systems, providers, user applications, etc. A token can be used to indicate authorized access (by a holder of the token) to certain resources at a corresponding transaction system. A token can be used with additional information that further authenticates a user of the token.

In case of payment systems, a token (open loop or closed loop token) can be associated with one or more instruments that fund transactions performed using this token. Similarly, for SaaS systems, the token can be associated with certain software resources. The tokens discussed herein can open loop tokens or closed loop tokens. Closed loop tokens typically can only be used at a certain provider and/or with at a certain payment system. For example, a closed loop token can only be used at a certain store or if funding a purchase using a certain payment system if the token is used for payment transactions. This certain provider is typically selected at the time the closed loop token is generated by a TSP. Open loop tokens can typically be used with any provider and/or any payment system that accepts that token.

In one embodiment, the TSP 110 can be a stand-alone application, e.g., be hosted by a separate entity from a TSP transaction system 112, and/or execute independently from execution of the TSP transaction system 112. In another embodiment, the TSP 110 can be implemented as a part of the TSP transaction system 112. For example, the TSP 110 can be hosted by the same server(s) as the TSP transaction system 112. The TSP 110 can share application programming interface (API) with the TSP transaction system 112. The TSP 110 can be a part of the same entity as the TSP transaction system 112.

A user device 114 can display a user interface (UI) 116. The UI 116 can display visual elements, such as to initiate the transaction. The UI 116 can receive input from a user, such as a selection from a user. The user device 114 can also receive input from the user via other input elements, such as via a keyboard, mouse, microphone (e.g., from a voice command), among others.

A service or an application (such as the user application 102) can be hosted by a combination of software and hardware. It is noted that the same term "hosting" is used herein to describe both software hosting and hardware hosting. When software hosting, a software service such as the TSP 110 can be hosted by the TSP transaction system 112. When hardware hosting, a computing device (such as a server or a user device) can provide resources such as memory, communication, and execution resources for execution of instructions, such as a server that hosts the TSP transaction system 112.

A provider 108 can be a business that provides goods or services to users. The provider 108 can have an online store (not shown) that facilitates activity online, e.g., on the Internet. The online store can provide functionality for a user to configure a product or a service, and/or place the product or service in a cart to order the product or service. The online store can provide functionality for the user to select a type of payment for the cart, and to submit the payment such that the products in the cart can be shipped to a shipping address specified by the user, or to schedule the service. The provider 108 can also offer this activity at a Point-of-Sale (PoS) device at a physical location where the provider 108 is located. The user can access this functionality at the provider's 108 PoS device, or via the user device 114, such as by using the user application 102 or a web browser. The provider 108 can receive the payment from the third party transaction system 104. The provider 108 can have a payment account at the TSP transaction system 112 or at the third party transaction system 104, and thus can receive the payment as a transfer of funds from a buyer's payment account to the merchant payment account at the respective transaction system.

In the example illustrated in FIG. 1, the TSP transaction system 112 can interface with one or more financial institutions, such as a financial institution 118(1) and a financial institution 118(2) (referred to collectively as financial institutions 118). Financial institutions 118 can provide financial services to users. The financial institutions 118 can be implemented as banks, credit unions, other deposit-taking institutions that accept and manage deposits and make loans, and other financial service providers. In some embodiments, the financial institutions 118 can include debit and/or credit card networks, e.g., for funding transfer of money between users. In some embodiments, the financial institutions 118 may include a provider of purchasing power that is associated with a loyalty program. In one embodiment, the TSP transaction system 112 can access funds associated with the first payment account (of the TSP transaction system 112) by accessing the financial institution 118(1), and transfer these funds to a second payment account of the TSP transaction system 112 by accessing the financial institution 118(2).

In case where the TSP transaction system 112 is a payment system, the TSP transaction system 112 can provide transaction resources for payment services, such as a fund transfer (e.g., a transfer of a certain monetary amount), between users. The transaction resources can include payment instruments used to complete payment transactions. The transaction preferences can be associated with the token that is issued by the TSP 110. The transaction resources at the TSP transaction system 112 can include one or more payment accounts for each user. For example, a first user can be associated with a first payment account, and a second user (e.g., the provider 108) can be associated with a second payment account (e.g., a provider payment account) at the TSP transaction system 112.

The transaction preferences can indicate which payment instruments can be used with a payment transaction. The transaction preferences can indicate that a default payment instrument for payment transactions is an account, at the TSP transaction system 112, that is associated with the user. The available payment instruments can include financial institutions 118(1) and/or 118(2). The payment instrument available for the payment transaction can also include in-store credit at the provider 108. The transaction preferences can indicate which of the payment instruments should be accessed first by the TSP transaction system 112 for completing the payment transaction. In some embodiments, the transaction preferences can indicate whether the TSP transaction system 112 can change use of an initial payment instrument (or another transaction resource) to one or more other payment instruments (or other transaction resources) for the transaction as indicated by the token. In some embodiments, the transaction preferences can indicate whether the TSP transaction system 112 can use additional payment instruments to top-off (e.g., by auto-reloading) funds to the default payment instrument. In some embodiments, the TSP transaction system 112 communicates with the user application 102 to provide a prompt for a manual confirmation for reloading of the funds.

The transaction preferences can indicate an order in which each of the associated payment instruments are used for top-off. The TSP transaction system 112 can determine the top-off order based on a plurality of factors, including a balance carried on a particular payment instrument, reward points associated with a particular payment instrument, and/or a default selection of the particular payment instrument. In some embodiments, the TSP transaction system 112 can determine an initial payment instrument for a certain payment transaction. The transaction preferences (that are associated with a received token for the payment transaction) can indicate that the additional payment instruments be changed based on a type of item being purchased via the payment transaction. The transaction preferences can indicate that some of the associated payment instruments can be only used for certain item types.

Token rules can define how a token is issued by the TSP 110. The token rules can also indicate how to generate a token with token scope that may limit where the token can be used, such as at which provider. The token rules can indicate which transaction resources can be used for the transaction with the provider 108. The token rules can indicate how to determine if the token to be generated will be a closed loop token or an open loop token. If the token is a closed loop token, the token rules can indicate a transaction system where the closed loop token can be used, such as the TSP transaction system 112. The issued token can indicate access to various transaction resources at the TSP transaction system 112. The token is provided to the third party transaction system 104, which then can communicate the token to the user application 102.

Transaction preferences can be generated by the TSP transaction system 112. The transaction preferences can be generated for (and associated with) each token that is issued by the TSP 110. The transaction preferences can be generated by the TSP transaction system 112 based on communication with the TSP 110. The TSP transaction system 112 can then receive a transaction request that includes the token. The transaction preferences can indicate how the TSP transaction system 112 detokenizes a token and processes a transaction (such as a payment transaction) that is requested. The transaction preferences can indicate how the TSP transaction system 112 processes the requested transaction, based on the token, on the initial transaction resource (e.g., as indicated by the token), and on a type of the transaction being requested. In some embodiments, a user account can be associated with multiple transaction instruments, and each token (generated in the manner described herein) usable by the user account is associated with a different subset of the transaction instruments.

The token rules can be used by the TSP 110 to generate a token 150. The token 150 can initially (i.e., at the time the token is generated) be associated with an initial transaction resource (e.g., a payment instrument), as indicated by the token request from a token requestor (e.g., the third party transaction system 104). The TSP transaction system 112 can communicate with the TSP 110 to determine transaction preferences for each generated token 150. The token rules can also be used to determine the transaction preferences for the token 150. The transaction preferences can then indicate that transaction resources can be revised after a token is received with a transaction request. Upon receiving the token as part of a transaction request, the TSP transaction system 112 can use the transaction preferences to determine whether the transaction resources can be changed for the transaction. The token rules need not be used by the TSP transaction system 112 to determine how to use and/or change the transaction resources for a given token once a transaction request is received. The token 150 can be a closed-loop token or an open-loop token. The TSP 110 can then communicate the token to the third party transaction system 104, which can then communicate the token 150 to the user application 102 of the user device 114. The token 150 allows the user device 114 (e.g., via the user application 102) to have authorization to access services of the TSP transaction system 112, such as via the provider 108.

In case of where the TSP transaction system 112 is a payment system, the token rules can be used, by the TSP transaction system 112 during token generation, to determine which payment instrument is initially used for a payment transaction. The token rules can also be used, by the TSP transaction system 112, to determine how the other payment instruments (e.g., the financial institution 118(1), 118(2), balance at a certain user's account at the TSP transaction system 112, and/or in-store credit at the provider 108) can be applied in different funding situations. For example, the transaction preferences can indicate, in cases where the initial payment instrument (e.g., account balance) doesn't have necessary funds as required by the payment transaction, that the TSP transaction system 112 would access additional funds at the provider 108. These additional funds (such as in-store credit funds at the provider 108) would be used to top-off (also referred to as top-up) the available funds as required to process the payment transaction.

In some embodiments, the transaction preferences can indicate that the user's account at the TSP transaction system 112 is reloaded using funds from the financial institution 118(1). The transaction preferences can indicate that the TSP transaction system 112 transmits communication to the user application 102 to prompt the UI 116 of the user device 114 for confirmation, from the user, that funds from the financial institution 118(1) can be used to reload some portion of the user account at the TSP transaction system.

Notifications can be used to notify the originating transaction system that different transaction resources are used to complete transactions then those indicted by the token. For example, the third party transaction system 104 requests that the TSP transaction system 112 performs a transaction using a token. This token (or the bundle that includes the token) can indicate that initial transaction resource is used at the TSP transaction system 112. In some embodiments, the TSP transaction system 112 can send a notification to the third party transaction system 104 indicating that a different payment instrument (from one indicated by the token) is used for processing the payment transaction.

Figure 1B:
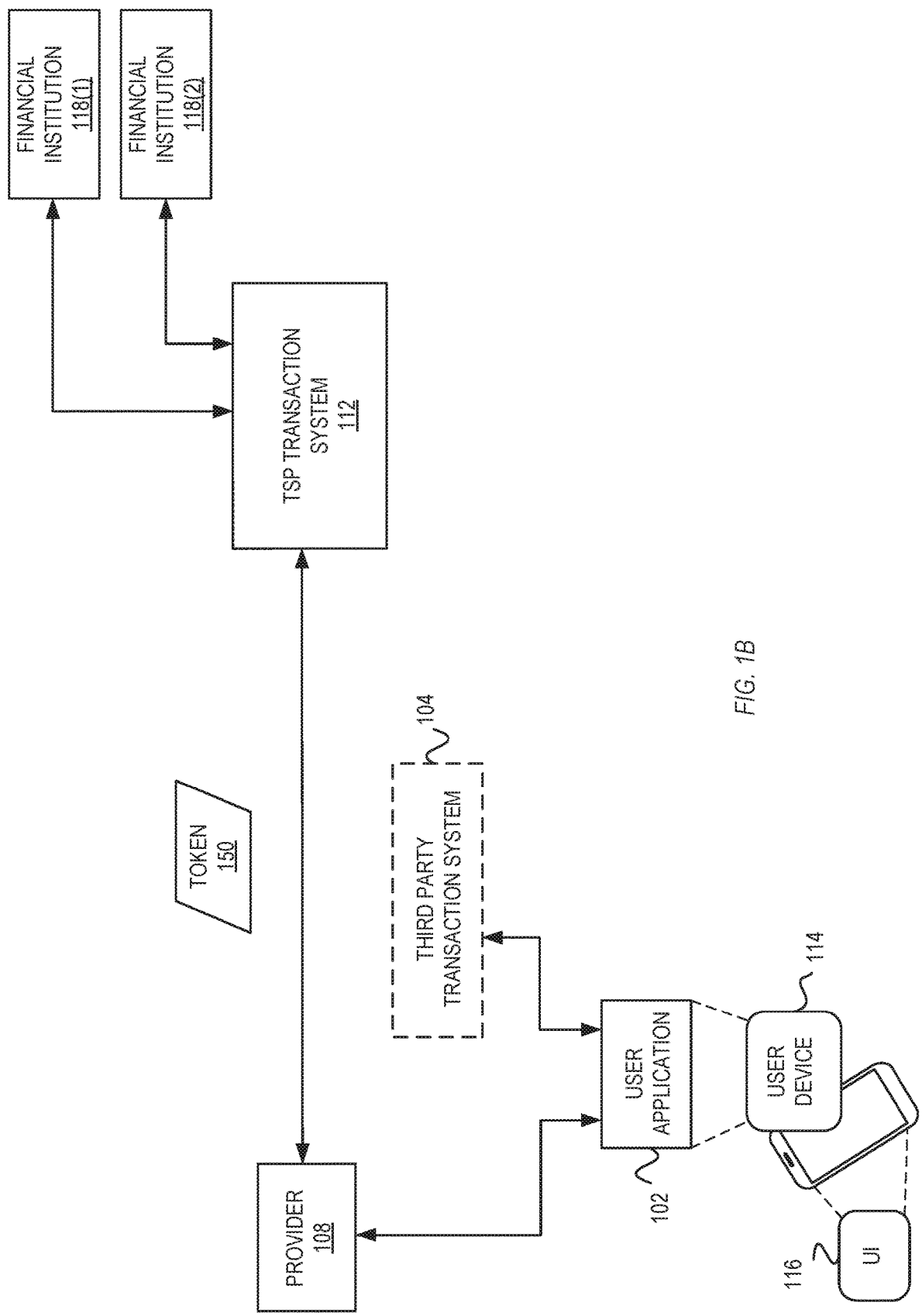
FIG. 1B is a system diagram illustrating embodiments of a communication system showing communication for performing transactions between the transaction system and a third party payment system.

FIG. 1B is a system diagram illustrating embodiments of a communication system showing communication for performing transactions between the transaction system and a third party payment system. For example, if the requested transaction requires more resources (e.g., funds) the TSP transaction system 112 can determine, based on the transaction preferences, to top-off (e.g., by auto-reloading) funds from other transaction resources. The TSP transaction system 112 can, for example, determine to reload an X amount of funds using transaction resources at the financial institution 118(1). The TSP transaction system 112 can determine to reload funds available at the TSP transaction system 112 (e.g., as associated with a user account corresponding to the user initiating the transaction request). It is noted that in some embodiments, the provider 108 can communicate with the TSP transaction system 112 as part of an in-store PoS transaction, or as part of an in-application transaction (e.g., accessing a merchant's application, such as user application 102, on the user device 114).

In response to receiving a transaction request that includes the token, the TSP transaction system 112 can perform the transaction. It is noted that throughout this description, the term "token" implies that an open-loop token can be used. Otherwise, if only the closed-loop token type can be used, this token type will be indicated.

In case of a closed-loop token, the TSP transaction system 112 can determine whether the transaction can be actually performed for the provider that is indicated by the closed-loop token. For example, the TSP transaction system 112 can determine that the transaction can be performed for the provider 108 as indicated by the closed-loop token. The TSP transaction system 112 then performs the transaction as indicated by the request.

In case of an open-loop token, the TSP transaction system 112 can access transaction preferences associated with the token. Based on the transaction preferences, the TSP transaction system 112 can determine whether to revise use of the transaction resource prior to performing the requested transaction. For example, the TSP transaction system 112 can revise which payment instrument to use when processing a payment transaction indicated by the request.

In case where the TSP transaction system 112 implements an SaaS system, the TSP transaction system 112 can revise use of SaaS resources based on the transaction preferences. Whereas the token can be associated with a first SaaS resource, the TSP transaction system 112 can determine to use a second SaaS resource for the requested transaction, i.e., a different SaaS resource than the one initially associated with the token. For example, the provider 108 can indicate that the SaaS services are available to the user application 102. In this example, the actual SaaS services can be provided by the TSP transaction system 112, and the provider 108 can provide the user interface/communication interface for the user application 102. The user application 102 can use the previously-received token (e.g., the token issued by the TSP 110), either directly or via the provider 108, to access the SaaS services provided by the TSP transaction system 112. The user application 102 can access the TSP transaction system 112 using a transaction request that includes the token 150. Upon receiving the transaction request from the user application 102 (or via the provider 108), the TSP transaction system 112 can process the transaction request as discussed herein. Upon processing the transaction request, the TSP transaction system 112 can provide the requested SaaS function to the user device 114.

In another example, the provider 108 can be an online merchant that offers products or services for sale to the user of the user device 114. In this example, the provider 108 can provide an on-line store where the user can select, via the UI 116 of the user application 102, a certain product or service to purchase. The user application 102 can use the previously-received token (e.g., the token issued by the TSP 110) to access the TSP transaction system 112, either directly or via the provider 108, to provide payment for the products or services provided by the provider 108. In some embodiments (not shown in FIG. 1B), the user application 102 can access the third party transaction system 104 using another token that is generated by the third party transaction system 104, to access a payment resource at the third party transaction system 104. The third party transaction system 104 can then, responsive to receiving a request with the other token, find and use the token (i.e., previously received from the TSP transaction system 112) to access the TSP transaction system 112. Thus, the user application 102 can indirectly access the payment resource(s) at the TSP transaction system 112.

In some embodiments, the user application 102 accesses the TSP transaction system 112 via the provider 108 using a transaction request that includes the token 150. Upon receiving the transaction request from the provider 108, the TSP transaction system 112 can process the transaction request as discussed herein. Optionally, upon processing the transaction request, the TSP transaction system 112 can communicate to the third party transaction system 104 that the payment transaction has been completed. For example, the TSP transaction system 112 can notify the third party transaction system 104 that funds for the payment request at the provider 108 have been transferred (e.g., from one or more accounts associated with the user of the user device 114).

Figure 2:
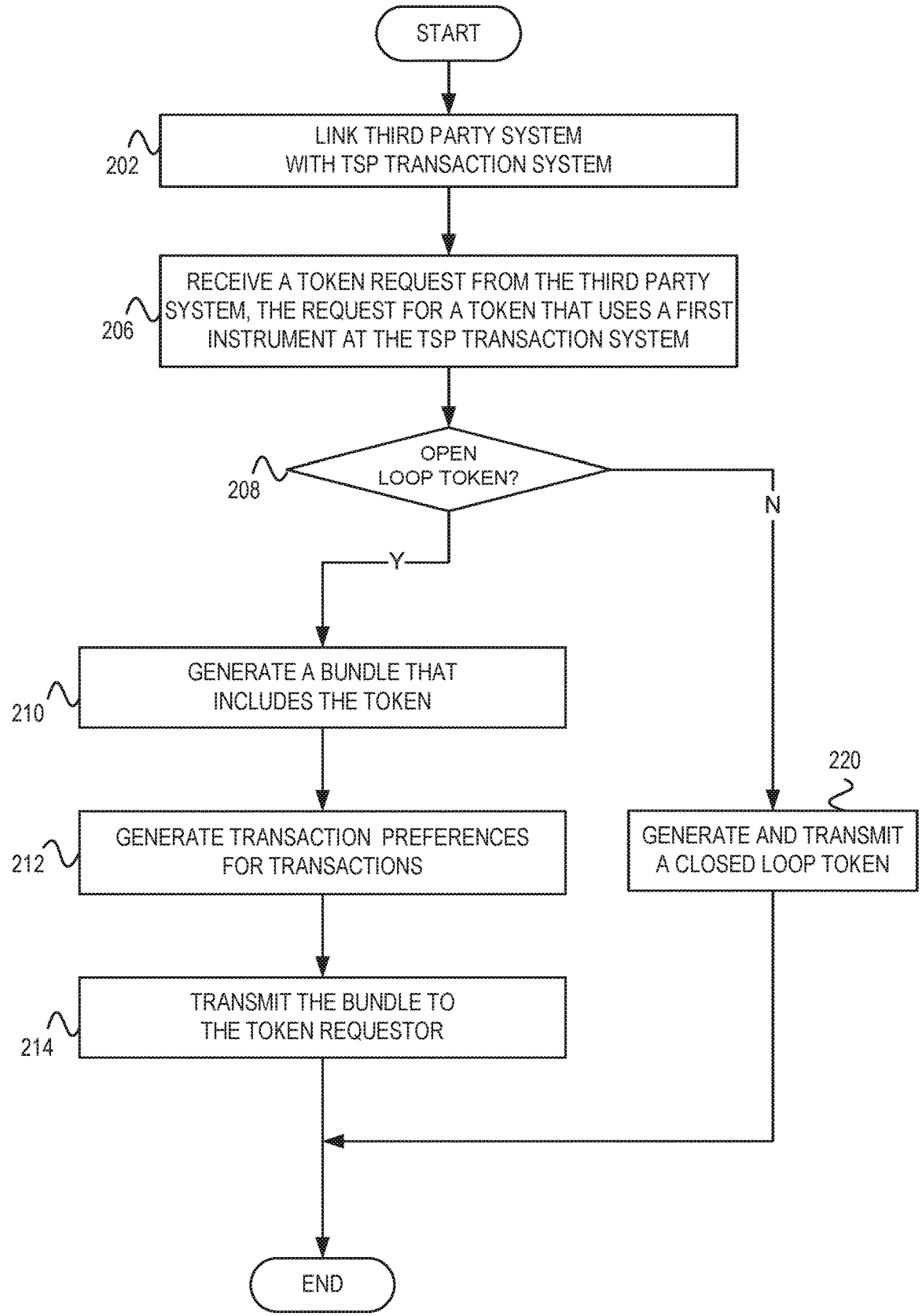
FIG. 2 is a flow diagram illustrating embodiments of operations for onboarding a transaction instrument of one transaction system onto another transaction system.

FIG. 2 is a flow diagram illustrating embodiments of operations for onboarding a transaction instrument of one transaction system onto another transaction system. The flow diagram of FIG. 2 is described with reference to the systems and components described in FIGS. 1A and 1B (for illustration purposes and not as a limitation). The example operations can be carried out by the TSP 110 and/or by the TSP transaction system 112. In some aspects, the transaction resource(s) provided by the TSP transaction system 112 are on-boarded onto the third party transaction system 104.

Beginning with 202, the TSP transaction system 112 is linked with the third party transaction system 104. Linking of the two transaction systems 104 and 112 can include mapping of user accounts (for the same user) between the transaction systems 104 and 112. Linking of the two transaction systems 104 and 112 can include exchanging registration and configuration information for the user. For payment systems, information about payment instruments can be shared. For SaaS systems, quality of service (QoS) parameters can be exchanged and/or configured on both of the transaction systems 104 and 112. The linking can include receiving authorization, from the third party transaction system, to change a certain transaction resource, at the TSP transaction system 112, for subsequent tokens generated at the TSP transaction system.

At 206, the TSP 110 receives a token request from the third party transaction system 104. The request is for a token that uses a first instrument at the TSP transaction system 112. For payment systems, the instrument can be a payment instrument that can be used to fund payment transactions.

For SaaS systems, the instrument can be a certain software component that can be provided to the user device.

At 208, the TSP transaction system 112 determines whether the requested token can be issued as an open loop token or a closed loop token. As discussed above with reference to FIG. 1, closed loop tokens typically can only be used at a certain provider (such as only with the provider 108) and/or with at a certain payment system (such as only with the third party transaction system 104 and/or the TSP transaction system 112). Open loop tokens can typically be used with any provider and/or any payment system that accepts that token. If the TSP transaction system 112 determines the that the token to be generated is an open loop token, the flow continues at 210, otherwise the flow continues at 220.

At 210, the TSP 110 generates a bundle that includes the token. The token can indicate an association with an initial financial transaction resource, or a collection of transaction resources, at the TSP transaction system. The TSP 110 can access token rules to determine token scope that indicates potential variations in token parameters (e.g., the generation of the token can be based on the token scope). The TSP 110 can revise use of the token based on the token scope and parameters of a user account at the TSP transaction system when a subsequent transaction request is received.

At 212, the TSP transaction system 112 generates transaction preferences for transactions. The transaction preferences can be generated based on the token rules associated with the token. For payment systems, the transaction preferences can indicate how to process payment transactions. For SaaS systems, the transaction preferences can indicate how to provide the SaaS components to the user device 114 (or another device associated with the user). In some embodiments, the transaction preferences can be generated based on user input. For example, for payment systems, the transaction preferences can be determined based on user input provided by the user to the user device (e.g., via the UI 116). Examples of such user input are described below with reference to FIGS. 4A-4C and 5.

At 214, the TSP transaction system 112 transmits the token to the token requestor, e.g., the third party transaction system 104. The token 150 can be transmitted as part of a bundle. In some embodiments, one or more parts of the bundle can be stored at the third party transaction system 104. At 220, the TSP transaction system 112 generates and transmits a closed loop token. Any transactions using the closed loop token can only be performed at the TSP transaction system.

Figure 3:
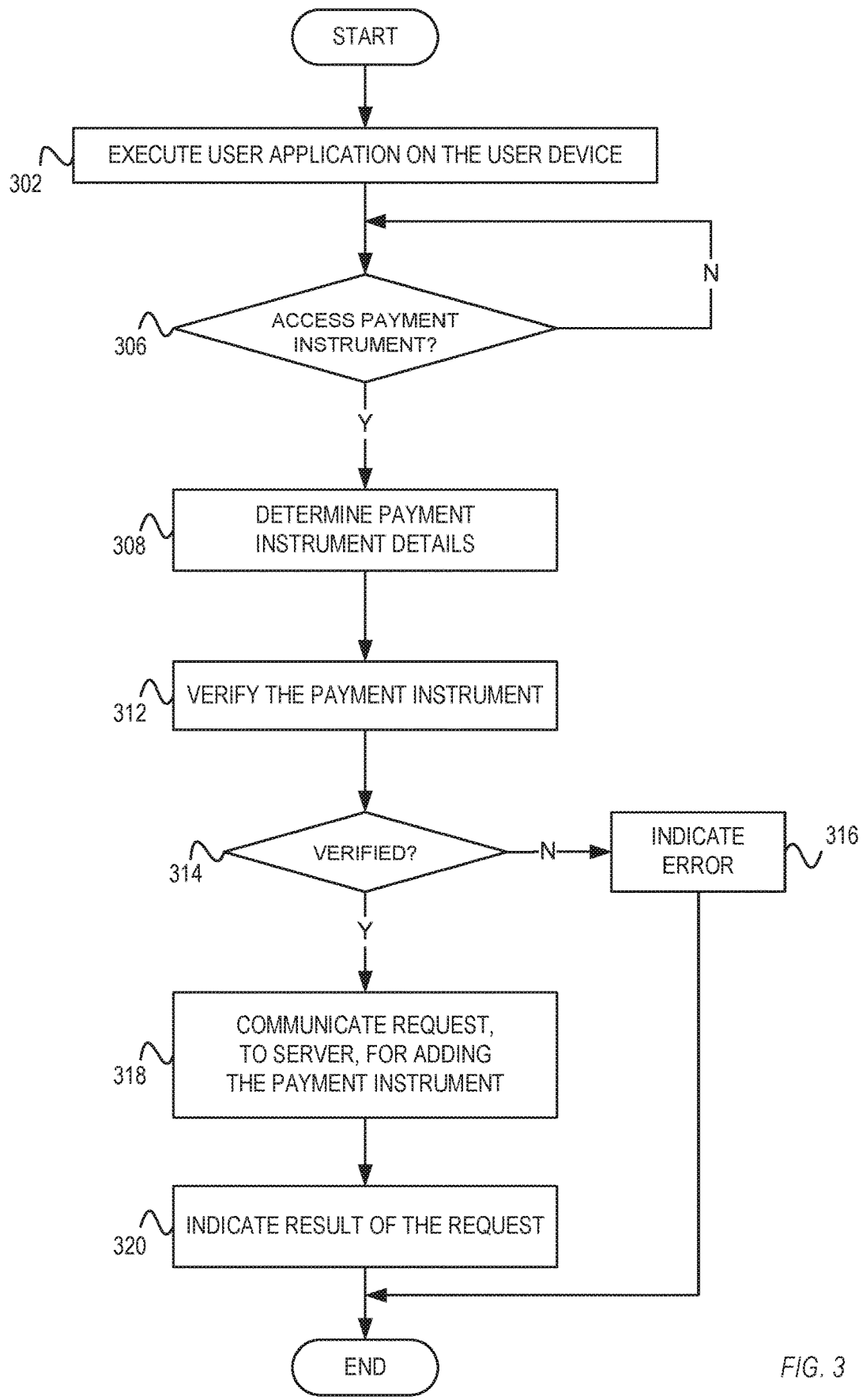
FIG. 3 is a flow diagram illustrating embodiments of operations, at the user device, for onboarding the transaction instrument of one transaction system onto another transaction system.

FIG. 3 is a flow diagram illustrating embodiments of operations, at the user device, for onboarding the transaction instrument of one transaction system onto another transaction system. The flow diagram of FIG. 3 is described with reference to the systems and components described in FIGS. 1A and 1B (for illustration purposes and not as a limitation). The example operations can be carried out by the user device 114, such as by the user application 102.

At 302, the user application is executed on the user device. With reference to FIG. 1, the user application 102 can be launched and executed on the user device 114. The user application 102 communicates with the third party transaction system 104. In some embodiments, the user application 102 can be provided by the third party transaction system 104, e.g., as an electronic wallet service for payment services of the third party transaction system. In other embodiments, the user application 102 can be provided by another payment provider, e.g., as an electronic wallet service that interfaces with the third party transaction system for providing payment services. It is noted that in some embodiments, the user application can be instead implemented by a mobile browser (e.g., at the user device 114) that accesses the third party transaction system 104 (or another payment provider).

In some implementations, at 302, a home screen may be displayed in the UI 116 of the user device 114. If the user (of the user application 102) is not already authenticated or logged onto the third party transaction system 104 through the user device, the user may be requested, via the UI 116, to enter log in information. The log in information can include a user name, email address, phone number, password, and/or PIN. Some authentication or login information, such as the user name, email address, or phone number, may be saved or automatically populated when the user application 102 is launched.

In some embodiments, the home screen may include a tab or other indicator that allows the user to select the option of adding a payment instrument to the user's account at the third party transaction system 104. For example, an NFC (Near Field Communication)-enabled card allows information contained within the card, such as in the form of an RFID or other NFC chip, to be communicated to another device (such as the user device 114) that is capable of reading the NFC-enabled card. In this example, once the option to add a card is selected, the UI 116 can display a request for the user to tap the NFC-enabled card with (or otherwise bring it is close proximity to, including physical contact, with) the user device 114. However, these and/or other payment instruments may be added using other techniques, such as by entering or scanning a unique identifier of the payment instrument.

At 306, the user application 102 can determine whether the payment instrument is accessed. If the payment instrument is accessed, the flow continues at 308. Otherwise, 306 can be performed again. With reference to the NFC-enabled card, the user application can determine that the user device 114 received payment instrument information via an NFC tap of the NFC-enabled card. The user device 114 can access information contained within the NFC-enabled card. The accessed payment instrument can be a credit card, a debit card, or other suitable payment instrument, among others.

At step 308, the user application can determine payment instrument details. With reference to FIG. 1A, the user application 102 can determine, for a payment instrument of a credit card, the card number, card type (e.g., credit, debit, a particular card network), expiration date, and/or issuing bank, etc. The user device 114 may have a built-in NFC reader or be adapted to receive an external NFC reader, such as through an I/O port of the user device 114. The user device 114 can display, via the UI 116, at least a portion of the payment instrument details. The user may revise or edit any information that is not correct. The user can initiate adding of a new payment instrument by interacting with the UI 116, such as by selecting or tapping an appropriate button like "Add Card," "Submit," or a similar button that indicates the user's acquiescence to submitting the payment instrument details to the payment service provider. The user device 114 may transmit the payment instrument details to the third party transaction system 104.

For a payment instrument that that is a credit card, only a partial card number, such as the last four digits, is displayed for security reasons. In another embodiment, the complete card number is displayed. The UI may, in some embodiments, also display a blank field for a card security code (CSC), also referred to as Card Verification Data (CVD), Card Verification Value (CVV or CVV2), Card Verification Value Code (CVVC), Card Verification Code (CVC or CVC2), Verification Code (V-Code or V Code), or Card Code Verification (CCV). This is usually a three or four digit numerical code on the credit card. If/once the displayed card information is correct, the user device 114 can then prompt the user to provide, via the UI 116, the card security code, such as through the mobile device keyboard/keypad or through a voice data entry function.

At 312, the user application 102 can verify the payment instrument. The user application 102 can verify the payment instrument by communicating with the third party transaction system 104. However, is some embodiments, the user application 102 can verify the payment instrument by communicating with the TSP transaction system 112. The user's name and address can be obtained and compared with the name and address associated with the payment instrument. For example, the user's name and address may be associated with the user's account at the third party transaction system 104, such as by being stored in a database. In another embodiment, the third party transaction system 104 may request the user to enter, e.g., via the UI 116, the user's name and/or address. The third party transaction system 104 may communicate with an issuer of the payment instrument, or access another service, to determine the name and address associated with the payment instrument. The verification can be performed at the user application 102 and/or at the third party transaction system 104.

At 314, the user application can determine whether the payment instrument is verified. For example, the user application 102 can determine whether the names and addresses match. If the payment instrument is not verified, the flow continues to 316. At 316, the UI 116 can display an error message. In some embodiments, at 316, the user may be prompted (e.g., via the UI 116) to re-enter payment instrument details or use a different payment instrument (after which the flow may continue at 312 or 306, respectively). If the payment instrument is verified, the flow continues to 318.

At 318, the user application communicates a request to the server for adding the payment instrument. With reference to FIG. 1, the user application 102 can transmit a request to the third party transaction system 104 to add the payment instrument. In some embodiments, the third party transaction system 104 can add the payment instrument automatically, e.g., in response to verifying the payment instrument. The third party transaction system 104 can associate the payment instrument with the user account at the third party transaction system 104. At 320, the user application indicates result of the request. For example, the user application 102 can indicate, via the UI 116, a processing indication while the third party transaction system 104 determines whether the payment instrument can be added after receiving the request.

Once the user application 102 receives a response message from the third party transaction system 104, the user application 102 can then indicate, via the UI 116, success (or failure) of adding the payment instrument. In case of payment systems, once the payment instrument (is added to the third party transaction system 104, the payment instrument can be accessed from the third party transaction system 104.

FIGS. 4A-4C and FIG. 5 illustrate embodiments of UI of the user device for onboarding the transaction instrument of one transaction system onto another transaction system. The UIs of FIGS. 4A-4C and 5 are described with reference to the systems and components described in FIGS. 1A and 1B and the flowchart of FIG. 2 (for illustration purposes and not as a limitation). The example UIs can be provided by the UI 116. In some aspects, at least some of the example UIs illustrate user input received by the user device 114 when generating the transaction preferences.

Figures 4A, 4B, 4C:
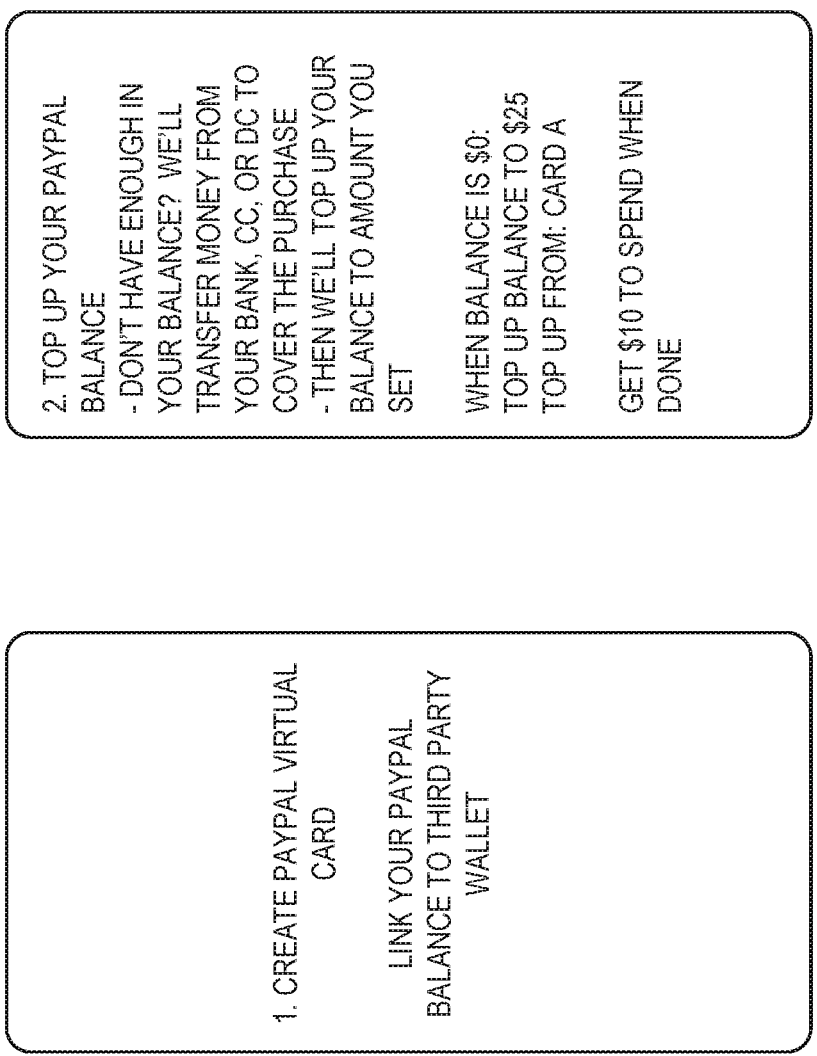
FIGS. 4A-4C illustrate embodiments of UI of the user device for onboarding the transaction instrument of one transaction system onto another transaction system.

FIG. 4A illustrates a prompt, for user input, provided by the UI 116 for adding the payment instrument to the third party transaction system 104. In response to this prompt, the user can provide user input. The user input is receivable by the user device 114, via the UI 116, to indicate user intent for onboarding a payment instrument of the TSP transaction system 112 onto the third party transaction system 104. In the example shown by FIG. 4A, a payment instrument of PAYPAL BALANCE at the TSP transaction system 112 is onboarded onto the third party transaction system 104 (e.g., any third party wallet such as ANDROID PAY).

FIG. 4B illustrates a prompt, for user input, provided by the UI 116 for user rules for a top-up. In response to this prompt, the user could provide user input, that would be received by the user device 114 via the UI 116, to indicate the user rules for topping off a selected payment instrument with one or more additional payment instruments. In the example shown by FIG. 4B, a payment instrument of CARD A is indicated to be used to top up balance from $0 to $25. FIG. 4C illustrates a result of adding the payment instrument to the third party transaction system 104, as well as of generating transaction preferences for top-off.

FIG. 5 illustrate another embodiment of the UI of the user device for linking transaction systems together, including determining of transaction preferences. FIG. 5 is similar to FIG. 4B, except that the process is for reloading instead of topping-off. Thus, FIG. 5 illustrates a prompt, for user input, provided by the UI 116 for user rules for a reload. In response to this prompt, the user could provide user input, which is receivable by the user device 114 via the UI 116, to indicate user rules for reloading a selected payment instrument with one or more additional payment instruments. In the example shown by FIG. 4B, a payment instrument of CARD A is indicated for reloading balance of the selected payment instrument from $0 to $25.

Figure 6:
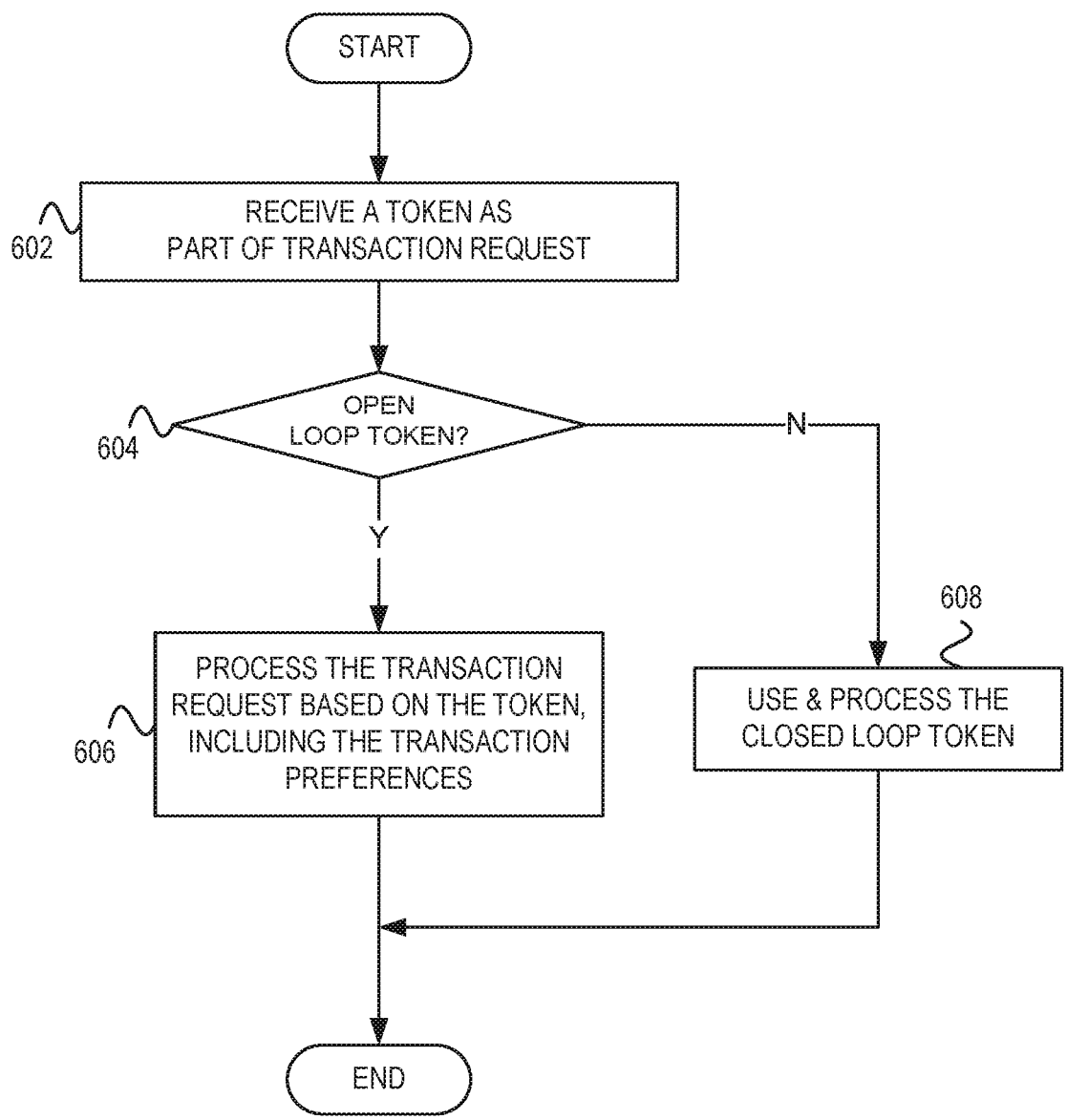
FIG. 6 is a flow diagram illustrating embodiments of operations for processing a request that includes a token for a transaction.

FIG. 6 is a flow diagram illustrating embodiments of operations for processing a request that includes a token for a transaction.

At 602, the TSP transaction system 112 receives the token with a transaction request. The transaction request can be transmitted by the provider 108. If the TSP transaction system 112 is a payment system, the transaction request can be for funding a purchase made at the provider 108. If the TSP transaction system 112 is an SaaS system, the transaction request can be for using a certain software component/services of a certain software component at the user device 114.

At 604, the TSP transaction system 112 determines whether the transaction request includes an open loop token or a closed loop token. If the TSP transaction system 112 determines the that the token is an open loop token, the flow continues at 604, otherwise the flow continues at 608.

At 606, the TSP transaction system 112 processes the transaction based on the transaction preferences. The TSP transaction system 112 can detokenize the token 150, and based on the transaction preferences associated with the detokenized token, a type of the transaction request, as well as on state of the instruments of the TSP transaction system 112, select one or more instruments with which to complete the requested transaction. For example, the TSP transaction system 112 can select a different instrument, or a combination of the initial instrument and another instrument, to complete the requested transaction. Embodiments of step 606 are described below with reference to FIG. 7. At 608, the TSP transaction system 112 uses and processes the closed loop token.

Figure 7:
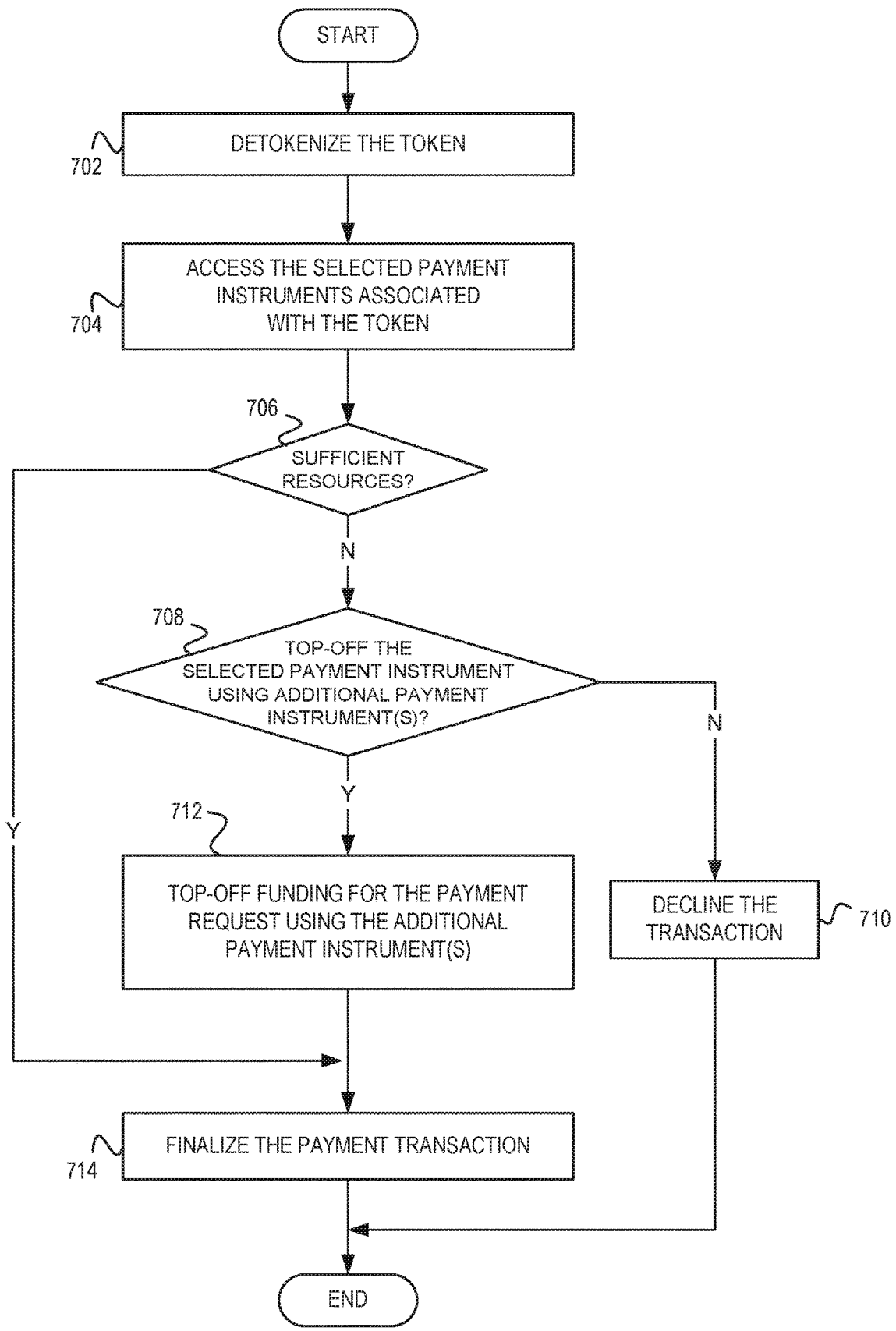
FIG. 7 is a flow diagram illustrating embodiments of operations for processing the transaction request based on detokenization of the token.

FIG. 7 is a flow diagram illustrating embodiments of operations for processing the transaction request based on detokenization of the token. The flow diagram of FIG. 7 is described with reference to the systems and components described in FIGS. 1A and 1B (for illustration purposes and not as a limitation). The example operations can be carried out by the TSP transaction system 112. The flow diagram of FIG. 7 can implement step 606 of FIG. 6.

Beginning with 702, the TSP transaction system 112 detokenizes the token. Detokenization can include retrieving/decoding the token 150 to determine the initial payment instrument at the TSP transaction system 112. For example, the detokenization process can generate a reference number that points to the initial payment instrument at the TSP transaction system 112.

At 704, the TSP transaction system 112 accesses the payment instrument that is associated with the token 150. In some embodiments, the token 150 can be associated with a plurality of payment instruments at the TSP transaction system 112. For example, the token 150 can be associated with accounts of the user at the TSP transaction system. At 706, the TSP transaction system 112 determines whether there selected instrument has sufficient resources for the transaction. If the TSP transaction system 112 determines the that there are sufficient resources for the transaction, the flow continues at 714, otherwise the flow continues at 710.

At 708, the TSP transaction system 112 determines whether to top-off the selected payment instrument using one or more additional payment instruments. In some embodiments, the TSP transaction system 112 can determine whether to use a different payment instrument. For example, the TSP transaction system 112 can determine that the initial/default payment instrument (e.g., the user's account at the TSP transaction system 112) indicated by the token does not have sufficient funds to cover the payment request. In this case, the TSP transaction system 112 can determine to top-off (e.g., by auto-reloading) the user's account with funds from the financial institution 118(1).

If the TSP transaction system 112 determines to top-off the selected payment instrument, the flow continues at 714, otherwise the flow continues at 710. At 710, the TSP transaction system 112 can decline the transaction for the payment request. At 712, the TSP transaction system 112 can top-off funding for the payment request based on the additional payment instrument(s). Some aspects of how to determine and process top-off funding are discussed below.

At 714, the TSP transaction system 112 can finalize the payment transaction based on the selected payment instrument. For example, the TSP transaction system 112 can process a payment order to transfer required funds (e.g., for the payment cost) to an account of the provider 108. In some embodiments, the payment order can be processed to transfer the required funds to the third party transaction system 104, which then can completer the payment transaction with the provider 108.

Examples of Transaction Processing Based on Transaction Preferences

Some examples of transaction processing based on transaction preferences are described below. These examples illustrate some aspects of elements 704-714 described above. The transaction can be initiated in response to the TSP transaction system 112 receiving a request that includes a token. When the provider 108 (e.g., a merchant) initiates a payment request to the TSP transaction system 112, the TSP transaction system 112 accesses the user account at the TSP transaction system 112 to determine whether there are enough funds in the user account for a payment cost specified for the payment transaction. Access to the user account at the TSP transaction system 112 can be implemented by a virtual prepaid card, or via another technique. The provider 108 can initiate the payment request responsive to a user request received at the user device 114 (e.g., a consumer of the point of sale).

The TSP transaction system 112 can then determine whether the balance of the virtual prepaid card is above or equal to the payment cost. If the balance is determined to be above the payment cost, then the TSP transaction system 112 may cause transmission of the funds from the virtual prepaid card to the provider 108. Once the funds are transmitted, the payment transaction is complete. If, however, the balance is determined to be is less than the payment cost, then the TSP transaction system 112 may cause the user account to be reloaded according to the transaction preferences. For example, the TSP transaction system 112 can cause the virtual prepaid card to be automatically reloaded with enough funds to cover the payment cost by transferring funds, to the virtual prepaid card, from one or more of the payment instruments.

When the balance in the user account at the TSP transaction system 112 is below a certain threshold (e.g., as set by the user), the TSP transaction system 112 can transmit a notification to the user application 102 for a top-off prompt. Responsive to receiving the notification, the user application 102 can prompt, via the UI 116, for a selection of a payment instrument for top-off. The UI 116 can display associated payment instruments as indicated by transaction preferences for the token associated with the transaction request. In addition to specifying which of the payment instruments can be used by the TSP transaction system 112 to complete the payment transaction, the user application 102 can also prompt the user to specify an amount that the TSP transaction system 112 can withdraw from each of the associated payment instruments. These selections can be communicated to the TSP transaction system 112 to modify the transaction preferences.

For example, based on the transaction preferences, the TSP transaction system 112 can withdraw $5.00 from payment instrument A, $10.00 from payment instrument B, and $20.00 from payment instrument C. In this exemplary scenario, if the prepaid virtual card has a balance of $0.00, but the payment transaction is for a purchase of $25.00 (i.e., the payment cost is $25.00), then the TSP transaction system 112 can transfer $5.00 from financial instrument A, $10.00 from financial instrument B, and $10.00 from financial instrument C to the prepaid virtual card. Upon completion of the transfer of funds from these three financial instruments to the prepaid virtual card, the TSP transaction system 112 can cause the $25.00 to be transmitted to the provider 108 (e.g., the merchant) and the requested transaction (e.g., the purchase from the merchant) will be complete.

Thus, the TSP transaction system 112 can process the payment transaction based on the transaction preferences. In one example, the transaction preferences indicate that only one of the payment instruments associated with associated with the user account, for the received token, is to be used for automatically reloading the virtual prepaid card. In this example, the TSP transaction system 112 may cause funds to be transferred from only the specified payment instrument to the consumer's virtual prepaid card when processing the payment transaction. In another example, the transaction preferences can indicate that multiple of user's payment instruments can be used for automatically reloading the virtual prepaid card.

The transaction preferences can indicate that payment instrument A is to be used for purchasing goods, while payment instrument B is to be used for purchasing services. Thus, the TSP transaction system 112 can receive the token for two separate payment transactions, one for a service and another one for purchase of goods. The TSP transaction system 112 can determine that the initial payment instrument does not have enough balance, e.g., that the prepaid virtual card is insufficient to cover the payment costs for one or both of payment transactions. As a result, the TSP transaction system 112 can automatically cause a transfer of funds from the payment instrument A to the prepaid virtual card (e.g., for the amount of the goods) and a transfer of funds from the payment instrument B to the prepaid virtual card (e.g., for the amount of the services). Some additional scenarios for processing payment transactions are described below.

Example A

A balance at the initial transaction resource (e.g., PayPal balance) is $17.00. The transaction preferences indicate a minimum balance of $0.00, a reload target of $50.00, and that auto reload is on. For a payment transaction with a payment cost of $6.00, the amount of $6.00 will be deducted from the consumer's PayPal balance. Based on the transaction preferences and the payment cost, the TSP transaction system 112 determines that reload is not needed. After the payment transaction is processed, the PayPal balance is $11.00.

Example B

The balance at the initial transaction resource is $17.00. The transaction preferences indicate a minimum balance of $0.00, a reload target of $50.00, and that auto reload is on. For a payment transaction with a payment cost of $16.00, the amount of $16.00 will be deducted from the consumer's PayPal balance. Based on the transaction preferences and the payment cost, the TSP transaction system 112 determines that reload is not needed. After the payment transaction is processed, the PayPal balance is $1.00.

Example C

The balance at the initial transaction resource is $17.00. The transaction preferences indicate a minimum balance of $0.00, a reload target of $50.00, and that auto reload is on. For a payment transaction with a payment cost of $26.00, the TSP transaction system 112 can trigger a reload, as the initial transaction resource $17.00 is not enough for the payment cost. Thus, the TSP transaction system 112 can perform the reload that will take the balance of the initial transaction resource after transaction to $50.00. The TSP transaction system 112 can determine the reload amount of $59 ($50.00+(−1)*($17.00−$26.00)). The amount of $26.00 will be deducted from the consumer's PayPal balance of $76.00 ($17.00+$59.00). The PayPal balance after the payment transaction is processed is $50.

Example D

The balance at the initial transaction resource is $17.00. The transaction preferences indicate a minimum balance of $0.00, a reload target of $50.00, and that auto reload is on. For a payment transaction with a payment cost of $89.00. the TSP transaction system 112 can trigger a reload, as the initial transaction resource is not enough. The TSP transaction system 112 can determine the reload amount of $122.00 ($50.00+(−1)*($17.00−$89.00)). The amount of $89.00 will be deducted from PayPal balance of $139 ($122+$17). PayPal balance after the payment transaction is $50.

Example E

The balance at the initial transaction resource is $17.00. The transaction preferences indicate a minimum balance of $10.00, a reload target of $50.00, and that auto reload is on. For a payment transaction with a payment cost of $8.00, the TSP transaction system 112 can process the payment transaction, at the initial transaction resource of $17.00 is enough to cover the payment cost of $8.00. After the payment transaction is processed, the TSP transaction system 112 can determine to trigger a reload, as the initial transaction resource of $9.00 is below the minimum balance of $10.00. The TSP transaction system 112 can determine the reload amount of $41.00 ($50.00+(−1)*($17.00−$8.00)) $41.00. After the transaction, PayPal balance is $50.00.

Example F

The balance at the initial transaction resource is $17.00. The transaction preferences indicate a minimum balance of $0, a reload target of $50.00, and that auto reload is off. For a payment transaction with a payment cost of $18.00, the TSP transaction system 112 can process a partial approval for $17.00. After the partial transaction, PayPal balance is $0 and the TSP transaction system 112 can transmit a notification to the user application 102. The notification can cause the user application 102 to display, via the UI 116, to approve a reload and/or the partial transaction. If the user application 102 determines that the user declines the reload and/or the partial transaction, the TSP transaction system 112 can cancel the payment transaction and refund the $17.00 back to the PayPal balance. Otherwise, the TSP transaction system 112 can process the partial transaction and reload the PayPal balance using a payment instrument as indicated by the transaction preferences. Once the PayPal balance is reloaded, the TSP transaction system 112 can finish processing the payment transaction.

Figure 8:
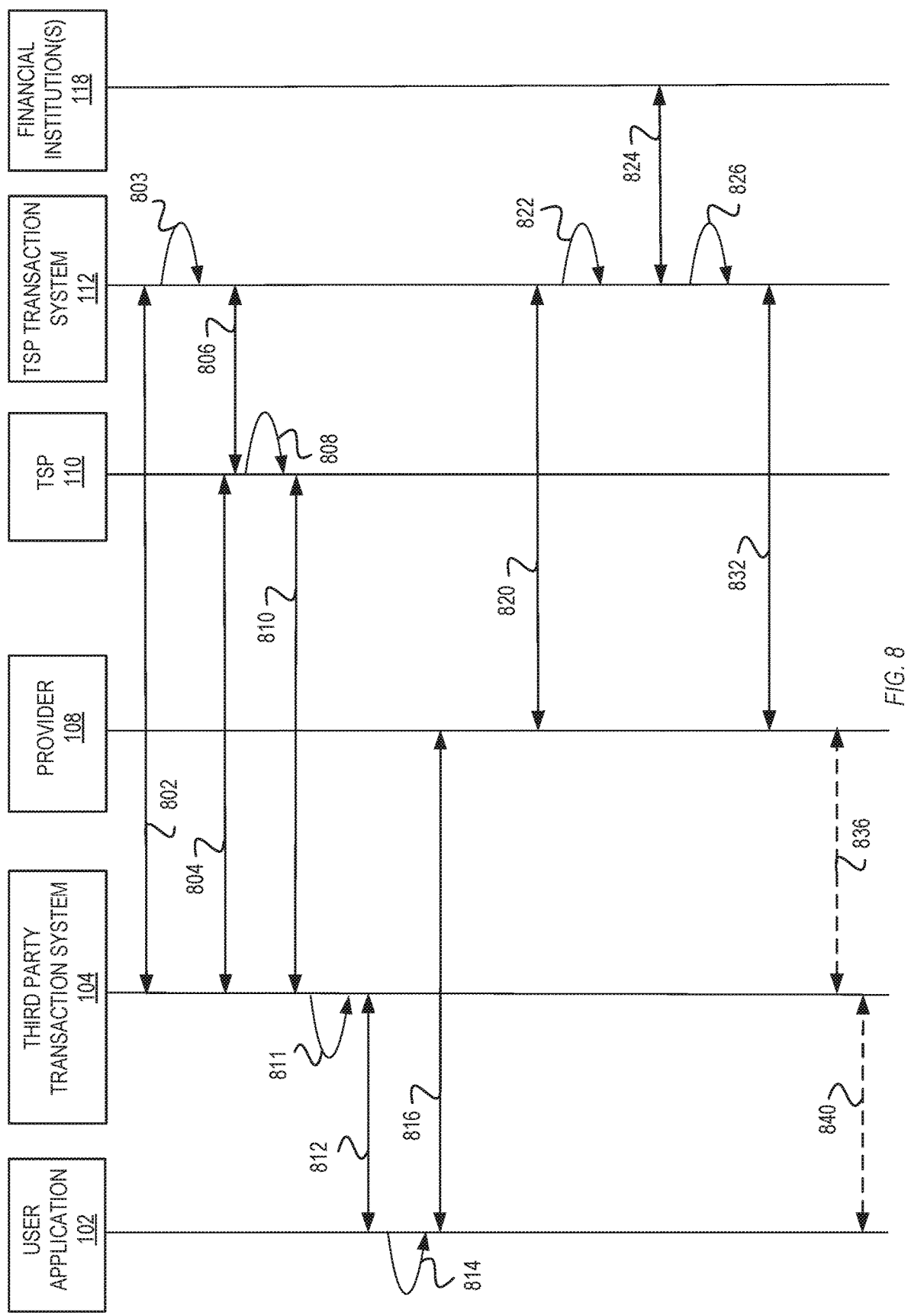
FIG. 8 is a timing diagram illustrating establishing communication between transaction systems and detokenization for transaction processing.

FIG. 8 is a timing diagram illustrating tokenization and detokenization for transaction processing. As shown by FIG. 8, the user application 102 communicates with the third party transaction system 104 and the provider 108. The TSP transaction system 112 communicates with the TSP 110, the provider 108, the third party transaction system 104, and the financial institution(s) 118. The communications of FIG. 8 can be performed over one or more communication networks. Portions of the timing diagram of FIG. 8 correspond to the flow diagrams of FIGS. 2, 3, 6, and 7.

At 802, the TSP transaction system 112 can communicate with the third party transaction system 104 to link the two transactions systems. At 803, the TSP transaction system 112 can generate user preferences for transactions with the third party transaction system 104. At 804, the third party transaction system 104 can communicate with the TSP 110 requesting a token. At 806, the TSP 110 can communicate with the TSP transaction system 112, such as access token rules for token generation. At 808, the TSP 110 can determine whether to generate an open or closed loop token, and generate the token. At 810, the TSP 110 can communicate the token (and optionally additional information (such as a bundle) identifying the initial payment instrument and/or other payment instruments available at the third party transaction system 104) to the third party transaction system 104. At 811, the third party transaction system 104 can process the token and any additional information. As a result of the processing, the token and the additional information can enable the user application 102 to access the initial payment instrument and/or the other payment instruments at the third party transaction system 104 (that are linked with the TSP transaction system 112), such as for use at the provider 108.

At 812, the third party transaction system 104 can communicate with the user application 102. This communication can include the token, or can include another token generated by the third party transaction system 104 for accessing payment accounts at the third party transaction system 104 (that are linked with the TSP transaction system 112). At 814, the user application 102 can process the communication from the third party transaction system 104. At 816, the user application 102 can communicate with the provider 108, such as to indicate selection of product(s) and/or service(s) for purchase. The user application 102 can indicate, using the token or another token, authorization to use certain payment instruments.

At 820, the TSP transaction system 112 can receive a transaction request (e.g., a payment request) from the provider 108. The transaction request can include the token. At 822, the TSP transaction system 112 can start processing the token for the transaction, such as to determine whether to use different payment instruments. At 824, the TSP transaction system 112 can communicate with the financial institution, such as to select a different payment instrument. At 826, the TSP transaction system 112 can determine to top-off funding for the payment request using payment instruments available at the TSP transaction system 112. AT 832, the TSP transaction system 112 can communicate with the provider 108 to indicate that the transaction request was successful. At 836, the provider 108 can communicate with the third party transaction system 104 to indicate the transaction request is successful. At 840, the third party transaction system 104 can communicate with the user application 102 to indicate that the transaction was successful.

It should be understood that FIGS. 1-8 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the diagrams of FIGS. 2, 3, and 6-8 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 9:
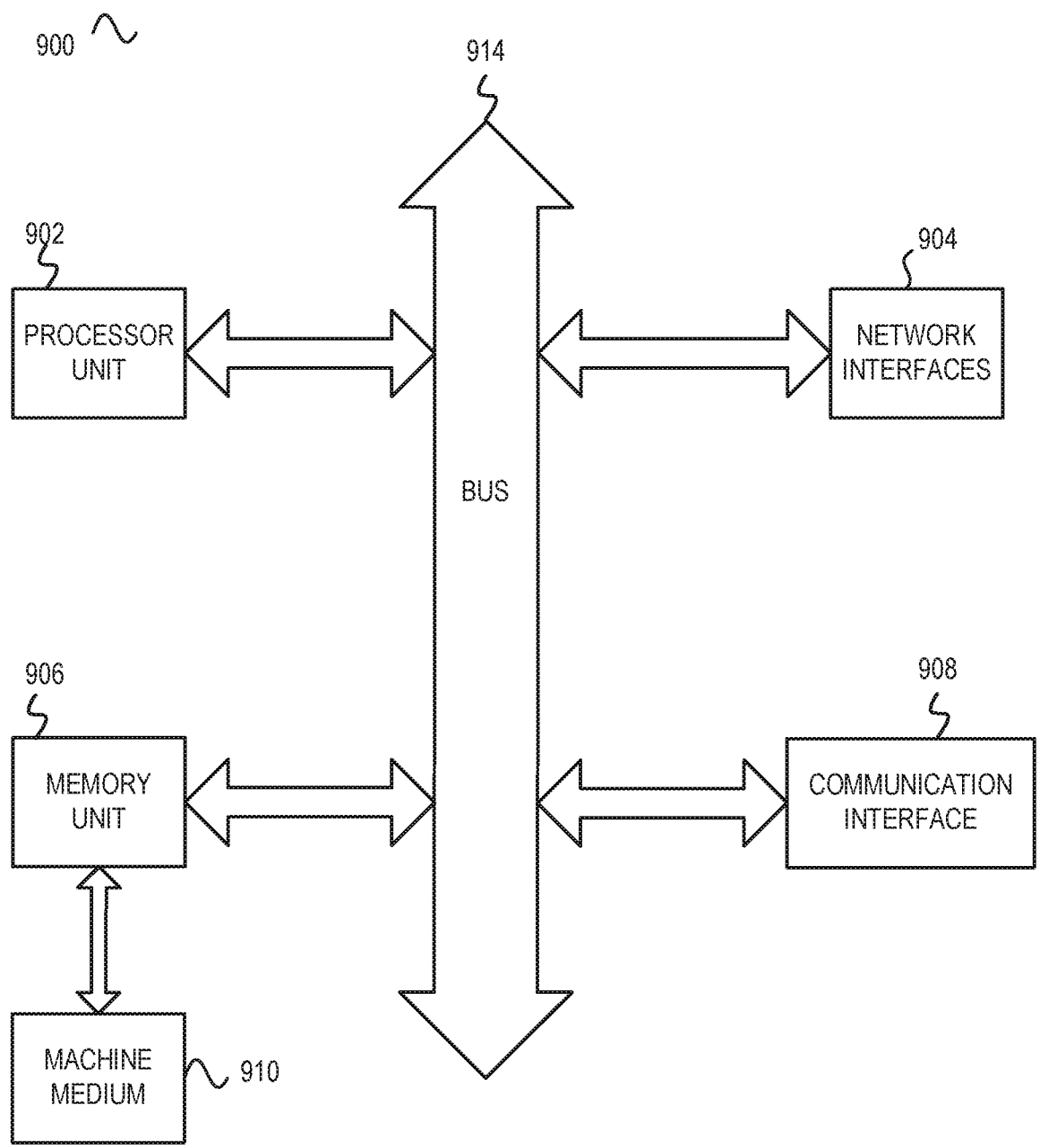
FIG. 9 is a block diagram of one embodiment of an electronic device used in the communication systems of FIGS. 1 and 4.

FIG. 9 is a block diagram of an exemplary embodiment of an electronic device 900 including a communication interface 908 for network communications. The electronic device can embody functionality to implement embodiments described in FIGS. 1-8 above. In some implementations, the electronic device 900 may be a laptop computer, a tablet computer, a mobile phone, a powerline communication device, a smart appliance (PDA), a server, and/or one or more another electronic systems. For example, a user device may be implemented using a mobile device, such as a mobile phone or a tablet computer. For example, a payment system may be implemented using one or more servers. The electronic device 900 can include a processor unit 902 (possibly including multiple processors, multiple cores, multiple nodes, and/or implementing multi-threading, etc.). The electronic device 900 can also include a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 900 can also include the bus 910 (e.g., PCI, ISA, PCI-Express, HyperTransport®, InfiniBand®, NuBus, AHB, AXI, etc.), and network interfaces 904 can include wire-based interfaces (e.g., an Ethernet interface, a powerline communication interface, etc.). The communication interface 908 can include at least one of a wireless network interface (e.g., a WLAN interface, a Bluetooth interface, a WiMAX interface, a ZigBee interface, a Wireless USB interface, etc.), In some implementations, the electronic device 900 may support multiple network interfaces—each of which is configured to couple the electronic device 900 to a different communication network.

The memory unit 906 can embody functionality to implement embodiments described in FIGS. 1-8 above. In one embodiment, the memory unit 906 can include one or more of functionalities for using detokenized tokens at communication systems for transaction processing. Any one of these functionalities may be partially (or entirely) implemented in hardware and/or on the processor unit 902. For example, some functionality may be implemented with an application specific integrated circuit, in logic implemented in the processor unit 902, in a co-processor on a peripheral device or card, etc. Further, realizations may include fewer or additional components not illustrated in FIG. 9 (e.g., video cards, audio cards, additional network interfaces, peripheral devices, etc.). The processor unit 902, the memory unit 906, the network interface 904 and the communication interface 908 are coupled to the bus 910. Although illustrated as being coupled to the bus 910, the memory unit 906 may be coupled to the processor unit 902.

While the embodiments are described with reference to various implementations and exploitations, it will be understood that these embodiments are illustrative and that the scope of the present disclosure is not limited to them. In general, techniques for using detokenized tokens at communication systems for transaction processing as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed:

1. A method for token-based automatic transaction processing, the method comprising:
    receiving, by one or more electronic processors, a token request from a first transaction system, the token request for generating a token associated with a first user account;
    in response to receiving the token request,
        generating, by the one or more electronic processors, the token that authorizes a use of an initial transaction resource at a second transaction system, and
        generating, by the one or more electronic processors, transaction preferences that associate the token with a plurality of transaction resources at the second transaction system;
    transmitting, by the one or more electronic processors, the token to the first transaction system for a use via the first transaction system;
    receiving, by the one or more electronic processors, a transaction request for using the token for a first transaction;
    in response to receiving the transaction request, processing, by the one or more electronic processors, the first transaction based on the token, a monetary balance of the first user account, and the transaction preferences, the processing the first transaction including determining whether to revise the use of the initial transaction resource to one or more other transaction resources;
    linking, by the one or more electronic processors, a second user account at the first transaction system with the first user account at the second transaction system, wherein the linking comprises receiving an authorization, from the first transaction system, to change a default transaction resource, at the second transaction system, for a subsequent token; and
    exchanging, in response to the linking and between the first transaction system and the second transaction system, registration and configuration information of the first user account and the second user account, the exchanging making the first user account and the second user account accessible at either the first transaction system or at the second transaction system.

2. The method of claim 1, wherein the token indicates an association with a collection of transaction resources at the second transaction system.

3. The method of claim 1, wherein the transaction request is received from a provider of a service to a user device that is associated with the token.

4. The method of claim 1, further comprising:
generating transaction preferences associated with the token, the transaction preferences indicating rules for processing the first transaction associated with the token.

5. The method of claim 1, further comprising:
accessing token rules to determine a token scope that indicates potential variations in token parameters, wherein the generating the token is based on the token scope.

6. The method of claim 5, further comprising:
determining, based on the token rules, to create user preferences that modify an application of the token.

7. The method of claim 5, further comprising:
revising use of the token based on the token scope and parameters of the first user account when the transaction request is received.

8. The method of claim 1, further comprising:
transmitting a notification to the first transaction system indicating that a scope of the token used by the first transaction system has changed.

9. A system comprising:
a non-transitory memory; and
one or more hardware processors coupled to the non-transitory memory and configured to read instructions from the non-transitory memory to cause the system to perform operations comprising:
receiving a token request from a first transaction system, the token request for generating a token associated with a first user account;
in response to receiving the token request,
generating the token that authorizes a use of an initial transaction resource at a second transaction system, and
generating transaction preferences that associate the token with a plurality of transaction resources at the second transaction system;
transmitting the token to the first transaction system for a use at the first transaction system;
receiving a transaction request, comprising the token, the transaction request for using the token for a first transaction;
in response to receiving the transaction request, processing the first transaction based on the token, a monetary balance of the first user account, and the transaction preferences, the processing the first transaction including determining whether to revise the use of the initial transaction resource to one or more other transaction resources;
linking a second user account at the first transaction system with the first user account at the second transaction system, wherein the linking comprises receiving an authorization, from the first transaction system, to change a default transaction resource, at the second transaction system, for a subsequent token; and
exchanging, in response to the linking and between the first transaction system and the second transaction system, registration and configuration information of the first user account and the second user account, the exchanging making the first user account and the second user account accessible at either the first transaction system or at the second transaction system.

10. The system of claim 9, wherein the token indicates an association with a collection of transaction resources at the second transaction system.

11. The system of claim 9, wherein the transaction request is received from a provider of a service to a user device that is associated with the token.

12. The system of claim 9, wherein the operations further comprise:
generating transaction preferences associated with the token, the transaction preferences indicating rules for processing the transaction associated with the token.

13. The system of claim 9, wherein the operations further comprise:
accessing token rules to determine token scope that indicates potential variations in token parameters, wherein the generating the token is based on the token scope.

14. The system of claim 13, wherein the operations further comprise:
determining, based on the token rules, to create user preferences that modify an application of the token; and
creating the user preferences that modify the application of the token.

15. A non-transitory machine-readable medium having instructions stored thereon, the instructions executable to cause one or more hardware processors to perform operations comprising:
receiving a token request from a first transaction system, the token request for generating a token associated with a first user account;
in response to receiving the token request,
generating the token that authorizes a use of an initial transaction resource at a second transaction system, and
generating transaction preferences that associate the token with a plurality of transaction resources at the second transaction system;
transmitting the token to the first transaction system for a use at the first transaction system;
receiving a transaction request for using the token for a first transaction;
in response to receiving the transaction request, processing the first transaction based on the token, a monetary balance of the first user account, and the transaction preferences, the processing the first transaction including determining whether to revise the use of the initial transaction resource to one or more other transaction resources;
linking a second user account at the first transaction system with the first user account at the second transaction system, wherein the linking comprises receiving an authorization, from the first transaction system, to change a default transaction resource, at the second transaction system, for a subsequent token; and
exchanging, in response to the linking and between the first transaction system and the second transaction system, registration and configuration information of the first user account and the second user account, the exchanging making the first user account and the second user account accessible at either the first transaction system or at the second transaction system.

16. The non-transitory machine-readable medium of claim 15, wherein the token indicates an association with a collection of transaction resources at the second transaction system.

17. The non-transitory machine-readable medium of claim 15, wherein the transaction request is received from a provider of a service to a user device that is associated with the token.

18. The non-transitory machine-readable medium of claim 15, wherein the operations further comprise:
   generating transaction preferences associated with the token, the transaction preferences indicating rules for processing the first transaction associated with the token.

19. The non-transitory machine-readable medium of claim 15, wherein the operations further comprise:
   accessing token rules to determine a token scope that indicates potential variations in token parameters, wherein the generating the token is based on the token scope.

20. The non-transitory machine-readable medium of claim 19, wherein the operations further comprise:
   determining, based on the token rules, to create user preferences that modify an application of the token; and
   creating the user preferences that modify the application of the token.

* * * * *